United States Patent [19]

Abbott

[11] 4,454,544
[45] Jun. 12, 1984

[54] TV PRIVACY SYSTEM USING GRAY SYNC

[75] Inventor: Liston Abbott, East Windsor, N.J.

[73] Assignee: RCA Corporation, New York, N.Y.

[21] Appl. No.: 328,834

[22] Filed: Dec. 9, 1981

Related U.S. Application Data

[63] Continuation of Ser. No. 112,174, Jan. 15, 1980, abandoned.

[51] Int. Cl.³ ............................................. H04N 7/16
[52] U.S. Cl. .................................... 358/120; 358/150
[58] Field of Search ....................... 358/120, 118, 150

[56] References Cited

U.S. PATENT DOCUMENTS

| | | | |
|---|---|---|---|
| 3,478,166 | 11/1969 | Reiter et al. ........................ | 358/120 |
| 3,813,482 | 5/1974 | Blonder .............................. | 358/120 |
| 4,095,258 | 6/1978 | Sperber ............................... | 358/120 |
| 4,222,068 | 9/1980 | Thompson .......................... | 358/124 |
| 4,313,133 | 1/1982 | Fukushima .......................... | 358/118 |

Primary Examiner—S. C. Buczinski
Attorney, Agent, or Firm—J. S. Tripoli; R. L. Troike; D. W. Phillion

[57] ABSTRACT

A decoder for reconstructing a standard composite video signal with standard synchronizing pulses from a video signal V with only gray sync encoding $E_{GS}$, of a repetition rate $f_{GS}$, and comprising a first generator for generating a signal $E_{VCO}$ having a controllable frequency $f_{VCO}$ which, in the absence of frequency control, is slightly different from $f_{GS}$, a second generator responsive to $E_{VCO}$ to form a composite blanking signal $E_B$ having a repetition rate equal to $f_{VCO}$ so that $E_B$ will slew with respect to $E_{GS}$ until $E_B$ and $E_{GS}$ become synchronized and a summer for summing $E_B$ and V to produce a reconstructed standard composite video signal when $E_B$ and $E_{GS}$ become synchronized. There is further provided a phase lock circuit for phase locking $E_{VCO}$ with the standard synchronizing pulses of said reconstructed video signal to maintain $E_B$ and $E_{GS}$ in a synchronized relationship.

10 Claims, 10 Drawing Figures

ENCODER

DECODER

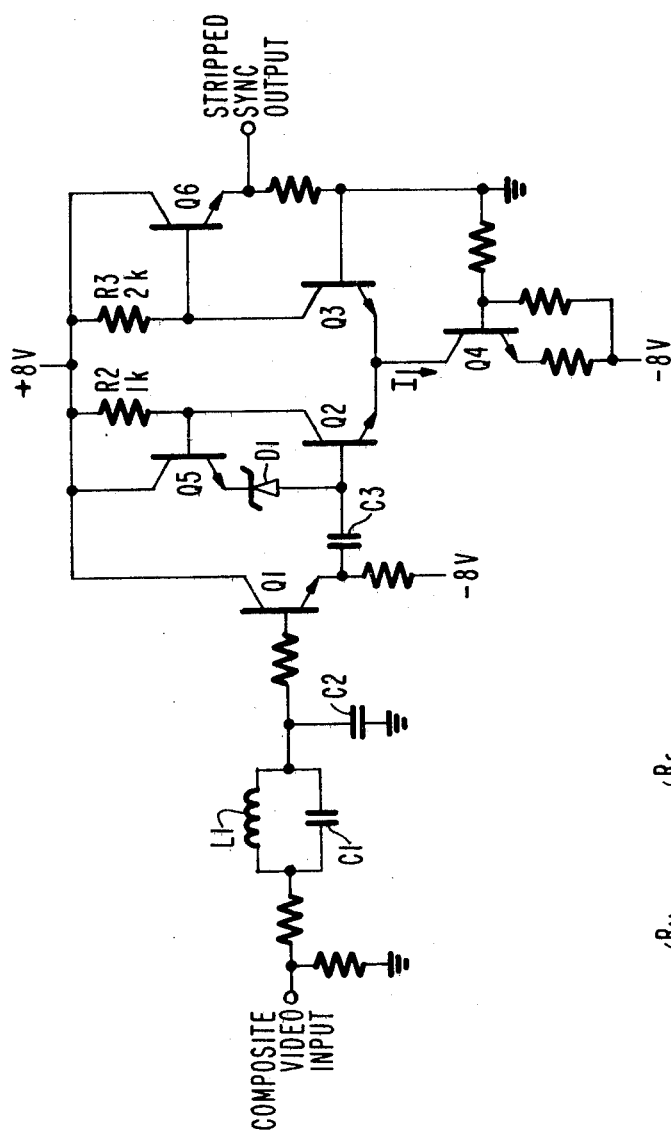
SYNC STRIPPER Fig. 4.
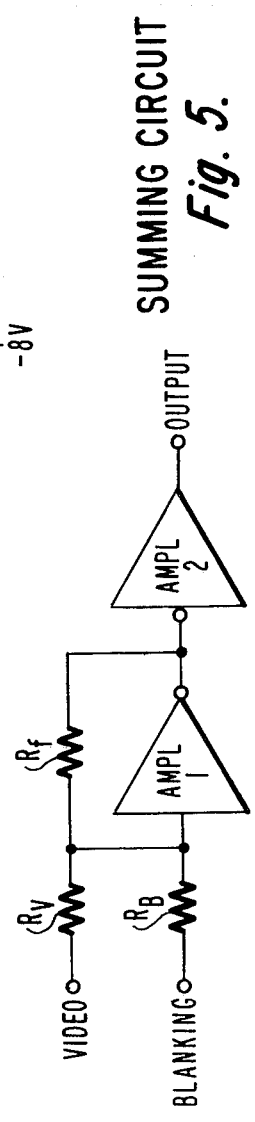
SUMMING CIRCUIT Fig. 5.

BLANKING OFFSET SIGNAL GENERATOR

TV PRIVACY SYSTEM USING GRAY SYNC

This is a continuation of co-pending application Ser. No. 112,174 filed Jan. 15, 1980 by Liston Abbott, and entitled "TV Privacy System Using Gray Sync" and now abandoned upon the filing of this continuation application.

This invention relates to the transmission and reception of a television video signal, and more particularly to a system in which a standard NTSC video signal is encoded at a transmitter to a form in which the horizontal sync pulses are at a gray-representing level rather than a blacker-than-black representing level, and the received video signal is decoded to, or restored to, a standard NTSC video signal for display on a standard TV monitor or receiver screen.

A video signal may be transmitted with gray sync for the purpose of providing security or privacy, since a standard TV receiver cannot extract horizontal synchronizing information from the gray sync. Systems providing TV privacy are becoming increasingly important because of the increasing numbers of earth stations capable of pirating television signals transmittee via satellites to subscriber earth stations which pay for the programs.

Another reason for transmitting TV video with gray sync may be to reduce the overall peak-to-peak amplitude of the composite video signal without reducing the peak-to-peak amplitude of the picture-representing part of the signal. The composite video signal can be transmitted via a satellite as a frequency modulated signal in which there is an increased deviation in frequency, and resulting improved signal-to-noise ratio, for the picture-representing part of the composite video signal.

Whenever the standard NTSC composite signal is modified to establish a gray sync format as described above for either video security or signal-to-noise enhancement, or any other purpose, some mechanism must be provided to enable the system to recover the synchronization information for use by the desired TV receivers or monitors. This may be accomplished by transmitting the composite sync or other timing information via a separate communication channel, or by a multiplexed technique, typically via a separate subcarrier, in the same channel. Then an appropriate decoding device is used to detect the sync information via the separate channel or subcarrier and process the modified video signal in such a manner as to convert it back to the original NTSC format or at least close enough to be useable in a standard display device.

In accordance with a preferred form of the invention there is provided a decoder for reconstructing a standard composite video signal with standard synchronizing pulses from a video signal having only gray sync encoding $E_{GS}$, of a repetition rate $f_{GS}$, and comprising a first generator for generating a signal $E_{VCO}$ having a controllable frequency $F_{VCO}$ which, in the absence of frequency control is slightly different from $f_{GS}$, and a second generator responsive to $E_{VCO}$ for generating a composite blanking signal $E_B$ having a repetition rate equal to $F_{VCO}$ so that $E_B$ will slew with respect to $E_{GS}$ until $E_B$ and $E_{GS}$ become synchronized. Also provided is a summer for summing $E_B$ and the video signal having the gray sync encoding $E_{GS}$ to produce a reconstructed standard composite video signal when $E_B$ and $E_{GS}$ become synchronized and phase lock logic for phase locking $E_{VCO}$ with the standard synchronizing pulses of the reconstructed video signal to maintain $E_B$ and $E_{GS}$ in a synchronized relationship.

IN THE DRAWING

FIG. 4 is a circuit diagram of a sync stripper useful in the encoder of FIG. 1, and in the decoder of FIG. 3;

FIG. 5 is a circuit diagram of a summing circuit useful in the encoder of FIG. 1, and in the decoder of FIG. 3;

Figure 1:
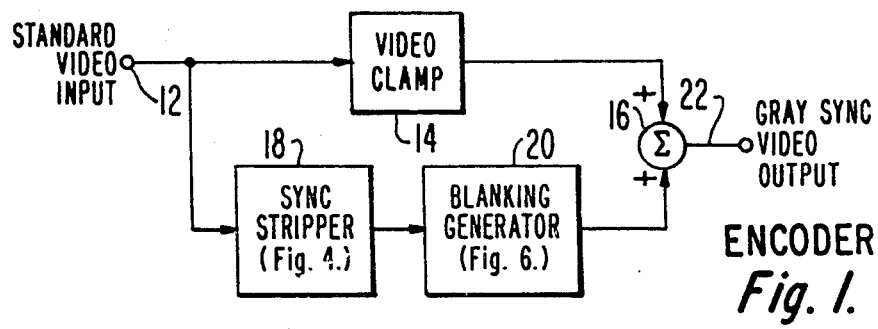
FIG. 1 is a block diagram of an encoder by which a standard video signal is translated to a video signal with gray sync.

FIG. 1 shows an encoder receptive at input terminal 12 to a standard video signal which is applied through a conventional video clamp 14 to one input of a summer 16, and through a sync stripper 18 and a composite retrace blanking offset signal generator 20 to another input of the summer 16. An output 22 of the summer provides a modified video signal in which the horizontal and vertical synchronizing pulses are compressed from blacker-than-black voltage levels to gray-representing voltage levels.

Figure 2:
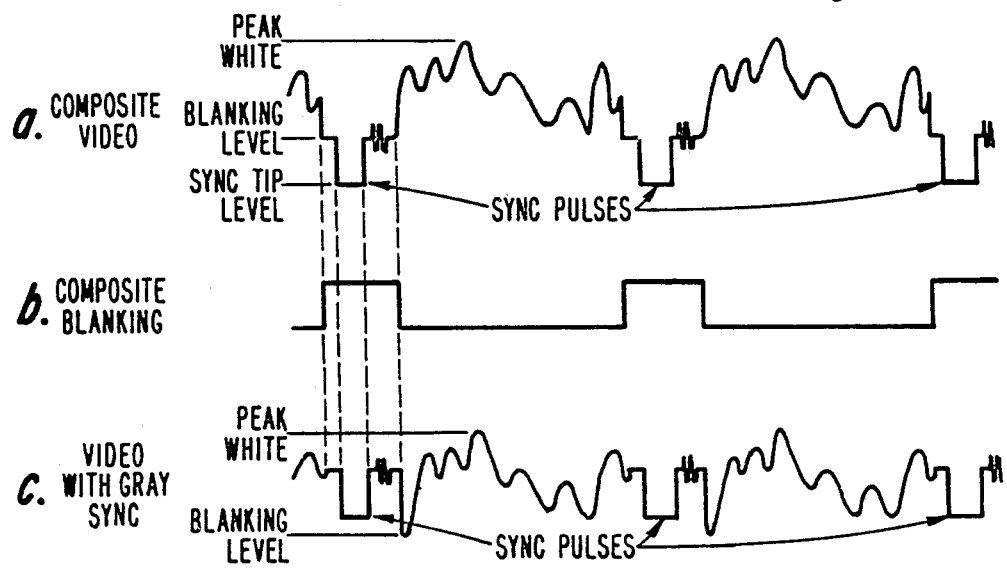
FIG. 2 is a chart of voltage waveforms which will be referred to in describing the block diagram of FIG. 1.

The standard NTSC video signal applied to the input terminal of FIG. 1 is as illustrated by the simplified waveform of FIG. 2(a). The output of the retrace composite blanking offset signal generator 20 is as illustrated by the waveform of FIG. 2(b). The offset waveform is the same as a retrace composite blanking signal except that it has a polarity and an amplitude relative to the composite video waveform of FIG. 2(a) so that when the two waveforms are combined in the summer 16 the result at 22 is as shown by the waveform of FIG. 2(c) in which the sync pulses are compressed to the gray-representing voltage levels of the picture information in the composite video signal. The video signal of FIG. 2(c) is modulated on a radio-frequency carrier and is broadcast. Standard television receivers are not able to produce a stable viewable picture from the signal because a standard receiver derives deflection synchronizing information from the most black-representing voltage levels of the signal, and the synchronizing information is in the gray-representing voltage levels of the signal. The only television receivers capable of producing a viewable picture are those equipped with a decoder.

Figure 3:
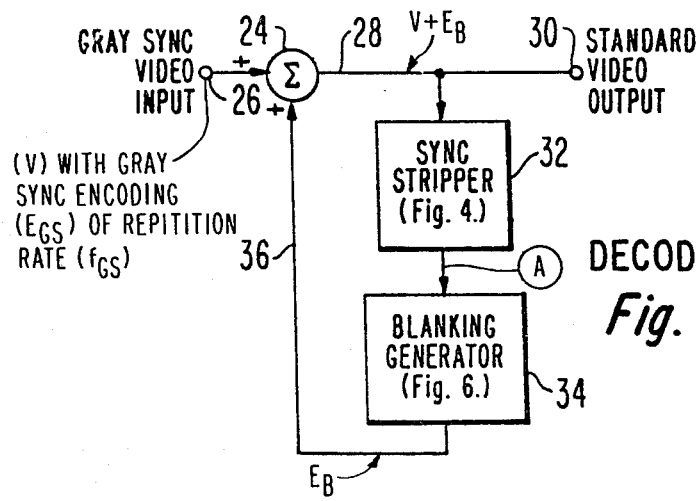
FIG. 3 is a block diagram of a decoder by which a received video signal with gray sync is translated to a standard video signal.

FIG. 3 shows a suitable decoder in which a summer 24 is receptive to a received video signal V with gray sync encoding $E_{GS}$ from terminal 26. The output $(V + E_B)$ appearing on output terminal 28 of the summer 24 is coupled to a standard video output terminal 30 and also through a sync stripper 32 and a retrace composite blanking offset signal generator 34 back to a second input 36 of the summer 24. The standard video signal output at 30 is suitable for reproducing a stable television picture on a standard TV receiver or monitor.

In FIG. 3, the incoming gray sync video is fed into one port of a summing circuit 24. The other input 36 to the summing circuit is a composite blanking signal $E_B$ generated by composite blanking generator 34 which is similar to the one used in the encoder of FIG. 1, except that the polarity of the blanking signal is reversed. The output of the summing circuit ($V + E_B$) is fed to a sync stripper 32 whose output is then used to drive the blanking generator 34. Thus a closed signal feedback loop is formed by the summing, sync stripper, and blanking generator circuits with the sync stripper and the blanking generator cooperatively responding to the output of the summer to produce the desired compensatory composite blanking pulses. The composite blanking pulses $E_B$ cause the output of the summing circuit to shift negatively by the same amount that the sync pulses were raised in the gray sync encoded waveform. The sync stripper, after filtering out the chrominance and high frequency luminance components, detects the most negative excursions of the signal at the output of the summing circuit. A phase locked loop in the blanking generator 34 (which will be described in detail in connection with FIG. (6) attempts to lock its voltage controlled oscillator (VCO) to the leading edges of the pulses from the sync stripper. Initially, the composite blanking signal $E_B$ generated in the decoder will have an arbitrary timing relationship with respect to the incoming gray sync video signal. Therefore, the pulses from the sync stripper output will be sufficiently sporadic to prevent lockups of the VCO. As the timing relationship changes due to the limited frequency difference between the horizontal line rates of the incoming video and the blanking signal generated in the decoder, the leading edges of the gray sync pulses become the most negative excursions of the signal out of the summing circuit. Since these pulses are regular in occurrence and the frequency is within the capture range of the phase locked loop, the VCO locks up in the correct phase and frequency to maintain the regenerated composite blanking signal in the desired timing relationship with respect to the incoming composite video signal. As long as this timing relationship is maintained, the gray sync pulses $E_{GS}$ will be shifted (amplified) back to their normal amplitude and the reconstructed signal waveform at the output of the summing circuit will be of the standard NTSC format.

The sync stripper 18 in FIG. 1, and the sync stripper 32 in FIG. 3, may be a known circuit as shown in FIG. 4 in which composite video signal is passed through a filter network consisting of inductor $L_1$, and capacitors $C_1$ and $C_2$. This filter attenuates the 3.58 MHz color subcarrier, noise, and other high frequency components of the video signal. The filtered signal is passed via $Q_1$, a low output impedance driver, to a high gain differential amplifier formed by transistors $Q_2$, $Q_3$, and current source $Q_4$. A negative feedback path from the collector of $Q_2$ to its base is formed by emitter follower $Q_5$ and zener diode $D_1$. Transistor $Q_6$ serves as a low output impedance driver for the stripped sync output line.

Because of the high differential voltage gain of the $Q_2$, $Q_3$ pair, a small voltage difference between the bases of $Q_2$ and $Q_3$ would cause the constant current I supplied by $Q_4$ to be switched completely through the emitter path of either $Q_2$ or $Q_3$, whichever one having the more positive base voltage. For identical transistors and equal base-to-emitter voltages, the current I would divide equally between the emitter currents of $Q_2$ and $Q_3$. In the circuit shown, the value of the current I and the zener voltage of $D_1$ are chosen such that in the quiescent state, only a very small portion of the current I flows through the collector-emitter path of $Q_2$. For example, for a zener voltage of 6.8 volts and a $Q_5$ base-to-emitter voltage drop of 0.65 volts, the collector current of $Q_2$ would be approximately 0.55 milliamperes (Ma). If the current supplied by $Q_4$ is 4 ma, then the collector current of $Q_3$ would be 3.45 ma. If the collector current of $Q_2$ tended to increase, the additional drop across resistor $R_2$ would cause the voltage across $D_1$ to fall below its zener voltage. The base current to $Q_2$ would be interrupted, causing its collector current to decrease. Similarly, if the collector current of $Q_2$ tended to decrease, the reduced drop across $R_2$ would cause additional base current to be supplied to $Q_2$ via $Q_5$ and $D_1$, causing the collector current of $Q_2$ to increase. Thus, a constant quiescent ratio of the collector-emitter currents of $Q_2$ and $Q_3$ is maintained. The relatively larger collector current of $Q_3$ causes a voltage drop across resistor $R_3$ such that the output signal level would be in the "low" state.

A negative excursion of the input signal subsequently appearing at the emitter of $Q_1$, would be transferred through capacitor $C_3$ to the base of $Q_2$. This would cause the collector current of $Q_2$ to decrease, and the reduced voltage drop across $R_2$ would cause an increase in the current through zener diode $D_1$. The additional current through $D_1$ rapidly increases the charge on $C_3$ such that the voltage at the base of $Q_2$ is maintained at the quiescent level. A positive excursion of the input signal would be transferred via $C_3$ to the base of $Q_2$ causing an increase in the collector current of $Q_2$. The increased voltage drop across $R_2$ causes the voltage across $D_1$ to drop below its zener voltage, thus interrupting any current flow through $D_1$. The further charging of $C_3$ is inhibited and its relatively slow discharge is through the high impedance of the base circuit of $Q_2$. The charge on capacitor $C_3$ is thus determined by the most negative excursion of the input signal, usually the sync pulse. Positive voltage excursions from the tips of the sync pulses cause the collector current of $Q_2$ to increase, thereby reducing the collector current of $Q_3$ and making the output signal line "high". The stripped sync output line is therefore "low" under quiescent conditions or coincident with the most negative excursions if the input signal and "high" otherwise.

The summer 16 in FIG. 1 and the summer 24 in FIG. 3, may be a circuit according to FIG. 5 which shows a circuit useful for summing the video and blanking signals to produce either a gray sync composite video signal or a standard NTSC composite video signal depending on the nature of the video input and the polarity of the blanking signal. Amplifier 1 is an operational amplifier with a high open loop gain. The resistors $R_v$, $R_B$, and $R_f$ determine the relative gains of the video and blanking signals and thus the amount of level shifting applied to produce the gray sync composite video signal from the encoder, or the standard NTSC composite video signal from the decoder. Amplifier 2 is used to provide any necessary signal polarity inversion, gain, and driving capability required.

The sync stripper circuit shown in FIG. 4 may be modified to serve as the video clamp 14 in FIG. 1. The modification consists of replacing the filter elements $L_1$, $C_1$, and $C_2$ with a resistor to the ground potential, thus forming an attenuator for the input signal. The operation of the circuit would be as described before, except that no filtering of the input signal is done and the output waveform is a clamped replica of the input composite video. The purpose of the video clamp circuit is to maintain the composite video signal fed to the summing circuit at a fixed reference level so that a constant level of the gray sync pulses at the output of the summing circuit can be maintained.

Figure 6:
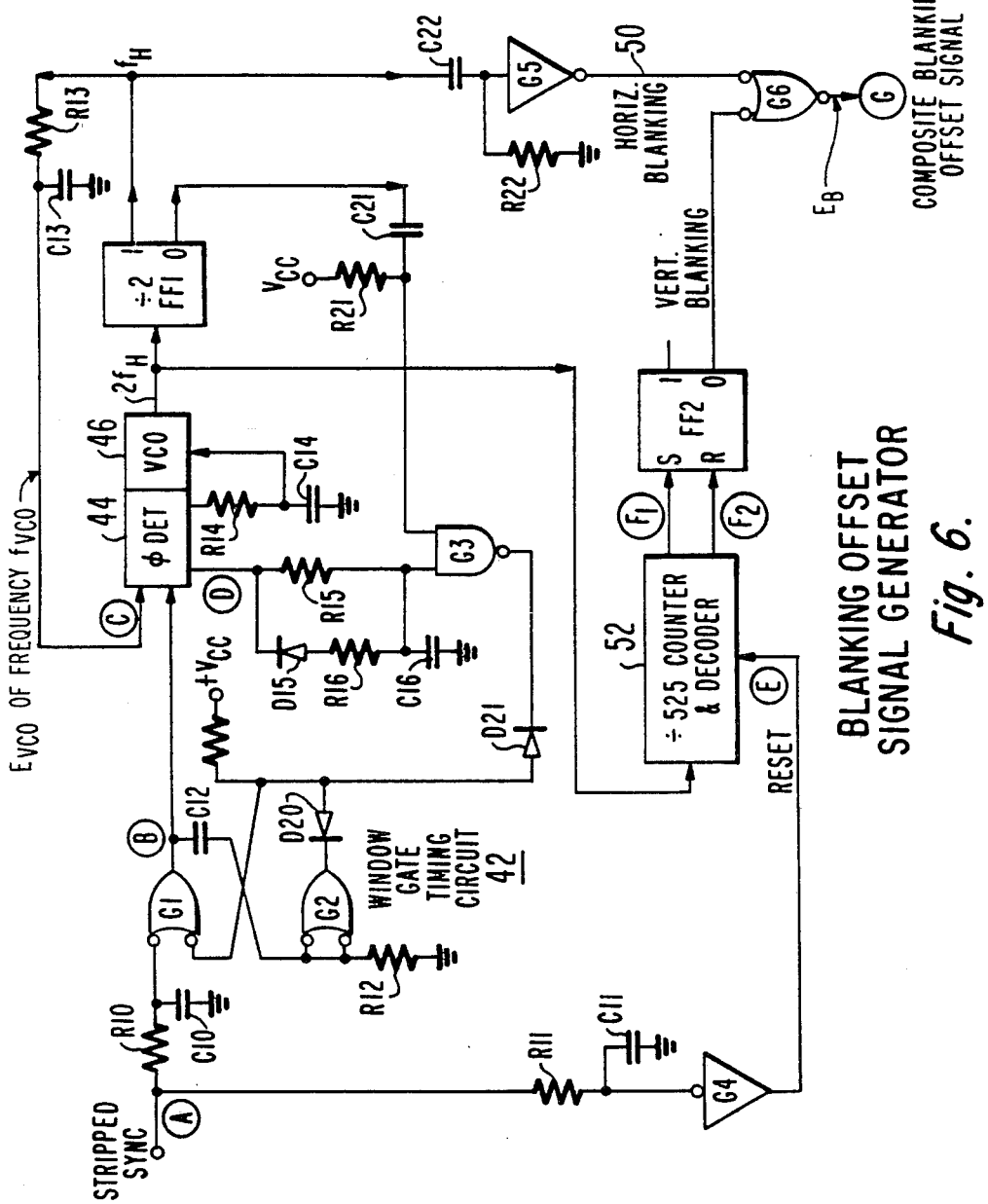
FIG. 6 is a diagram of a composite blanking offset signal generator useful in the encoder of FIG. 1, and in the decoder of FIG. 3.
Figure 7:
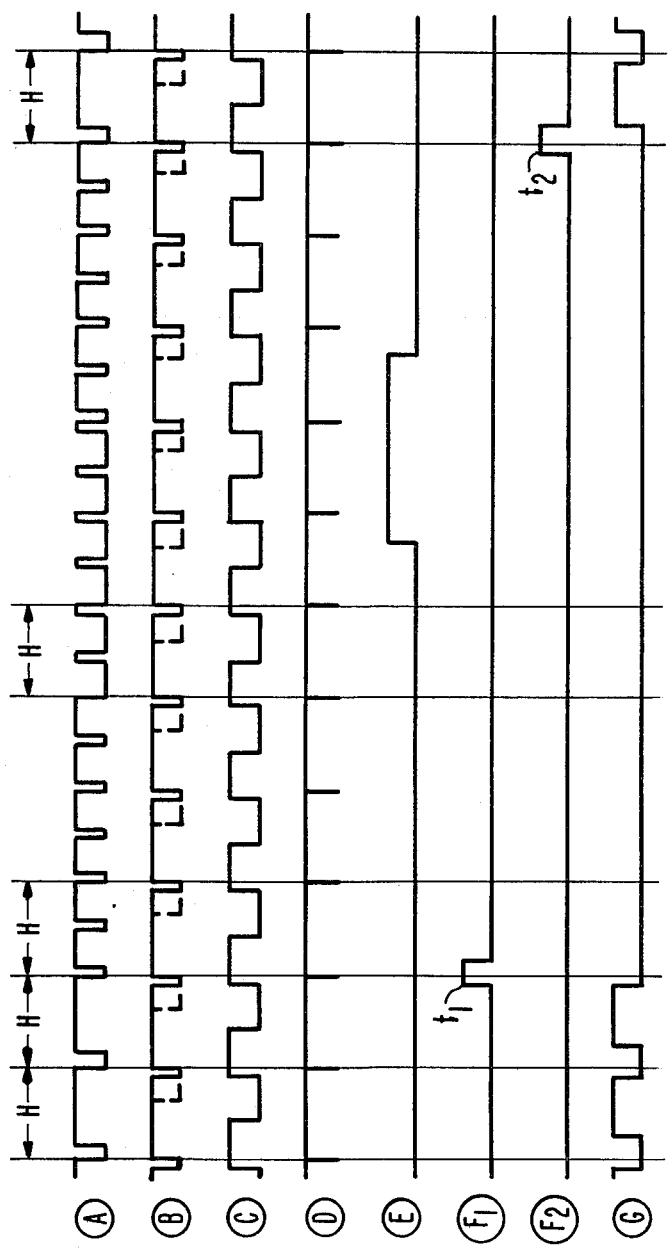
FIG. 7 is a chart of voltage waveforms which will be referred to in describing the signal generator of FIG. 6.

FIG. 6 is a circuit diagram of a composite blanking offset signal generator useful in the block 20 of FIG. 1, and also in the box 34 of FIG. 3. The circuit receives a stripped sync signal as shown in FIG. 7A and generates a composite blanking offset signal as shown in FIG. 7G.

In FIG. 6 the stripped composite sync is fed from input terminal 40 to a logic gate $G_1$ via a network $R_{10}$, $C_{10}$ which serves to filter extraneous high frequency noise which may be present on the stripped sync waveform. The combination of gates $G_1$, $G_2$, capacitor $C_{12}$, resistor $R_{12}$ and diode $D_{20}$ form a window gate timing circuit 42 with a period of approximately ¾ H, where H is the time duration (63.5 $\mu s$) of one horizontal line period of a NTSC video signal. The timing circuit is triggered by the negative going edge to each sync pulse, except for those equalizing and serrated vertical sync pulses which occur halfway between horizontal line scans of the video waveforms. The ¾ H time period of the timing circuit effectively inhibits any reaction of the circuit to the ½ line pulses. The output of the timing circuit which is triggered at the horizontal line rate ($f_H$) is fed to one input of the phase detector 44 in a phase-locked loop including a voltage-controlled oscillator (VCO) 46, a divide-by-2 circuit FF1, and a delay network consisting of $C_{13}$, $R_{13}$. A type CD4046 integrated circuit made by RCA Corporation may be used as the phase detector and VCO. The other input to the phase detector is taken from the "1" output of the ÷2 circuit via the $R_{13}$, $C_{13}$ delay network. The output of the phase detector is a logic signal whose level is a measure of the relative phase or frequency difference between its two inputs. The phase detector output is filtered by the $R_{14}$, $C_{14}$ combination whose output, in turn, is fed to the VCO causing the phase and/or frequency of the VCO output signal to change in a manner to make the positive transitions of the input signals to the phase detector coincident with each other. When the phase-locked loop is in a locked condition, the VCO frequency is twice the horizontal line frequency of the video input ($2f_H$) and is divided by 2 by FF1. The $R_{13}$, $C_{13}$ circuit provides a delay of approximately 1 $\mu s$, which then forces the $f_H$ signal (waveform 7C) to have its positive transitions occur 1 $\mu s$ before the leading edges of the stripped sync signal (waveform 7A). The phase detector of the circuit shown also provides a phase pulse output (waveform 7D), which is a train of negative pulses whose width is a measure of the phase difference between the two phase detector inputs, (waveforms 7B and 7C). When the loop is in the locked condition, the pulses become extremely narrow or do not appear at all. This signal is integrated by a network whose charging time constant is determined by $R_{15}$ and $C_{16}$. The discharge time constant, when the signal at point D goes negative, is made shorter because of the additional discharge path through $R_{16}$ and $D_{15}$. A high voltage across $C_{16}$ is therefore an indication that the loop is locked, and a low voltage across $C_{16}$ indicates that the loop is unlocked. This lock/unlock signal, along with a differentiated pulse train derived from the "0" output of FF1 is fed to logic gate $G_3$. When the loop is unlocked, the output of $G_3$ is high and diode $D_{21}$ is reverse biased, isolating the output of $G_3$ from the $G_1$, $G_2$ timing circuit 42. When the loop is locked, and output of $G_3$ is low except for positive pulses of short duration determined by the $R_{21}$, $C_{21}$ time constant. These positive pulses passed through diode $D_{21}$ extend the period of the $G_1$, $G_2$ timing circuit to within a 1 $\mu s$ "window" of the normal occurrence of the leading edges of the stripped sync pulses. Thus, a substantial improvement in the noise rejection or inhibition of false triggering due to extraneous noise impulses on the stripped sync signal is realized. The dotted lines of waveform 7B show the shape of this signal when the loop is unlocked.

The $f_H$ signal is differentiated by $C_{22}$, $R_{22}$ and formed at 50 into the horizontal blanking component of the composite blanking signal. The vertical blanking component is formed by dividing the $2f_H$ signal from the VCO by 525 and using appropriately decoded timing pulses $t_1$ and $t_2$ to set and reset a flip-flop FF2. The ÷525 counter 52 is reset by a pulse formed by integrating the serrated vertical pulses of the stripped sync via $R_{11}$, $C_{11}$ and passing the resulting signal through gate $G_4$. All the logic gates, flip-flops FF1, FF2 and the counter and decoding circuits for $t_1$ and $t_2$ can be constructed using parts and designs readily available from various manufacturers including RCA Corporation.

Figure 10:
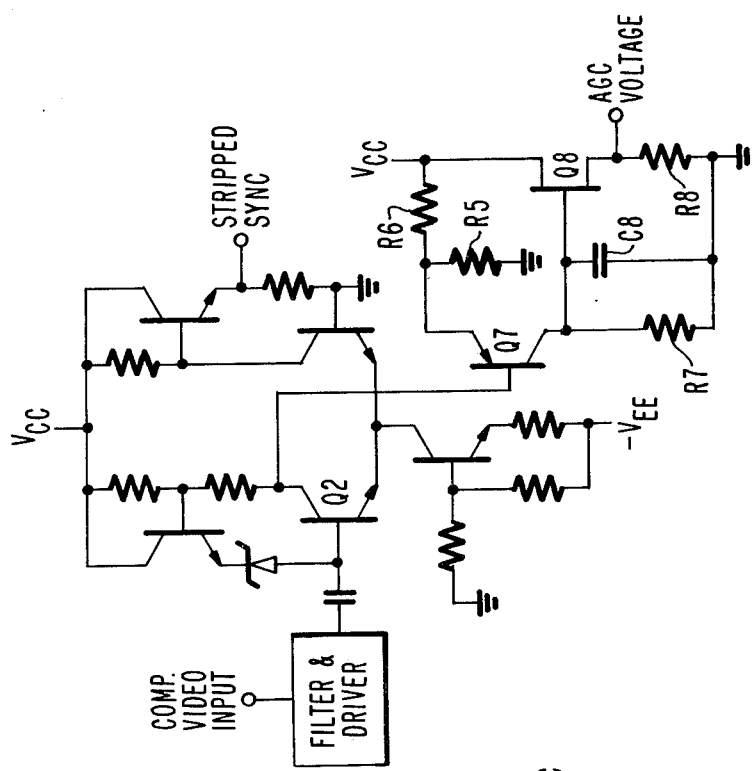
FIG. 10 is a circuit diagram of a sync stripper useful in the encoder of FIG. 8, and useful in the decoder of FIG. 9.
Figure 9:
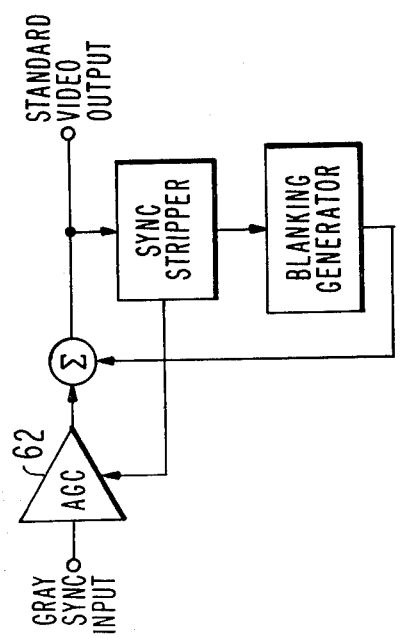
FIG. 9 is a block diagram of a decoder including an AGC amplifier.
Figure 8:
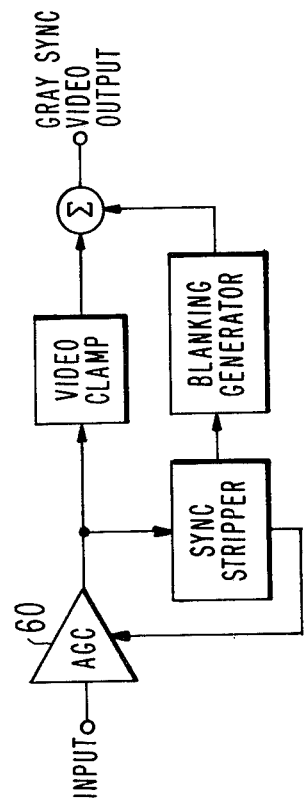
FIG. 8 is a block diagram of an encoder including an AGC amplifier.

In some cases where variations in the incoming signal levels are expected, the system implementation described before may be improved by adding automatic gain control (AGC) circuits in the signal paths ahead of the encoder and decoder units as shown at 60 and 62 in FIGS. 8 and 9. The AGC voltages may be derived from a sync stripper as shown in FIG. 10. A reference voltage at the emitter of $Q_7$ is established by resistors $R_5$ and $R_6$ and the +$V_{cc}$ power supply. $Q_7$ is biased off in the quiescent mode and for the time duration of the incoming sync pulses. When the input signal goes positive through the blanking level, the collector voltage of $Q_2$ drops below the reference voltage at the emitter of $Q_7$. $Q_7$ turns on and its collector current charges capacitor $C_8$. The positive voltage developed across $C_8$ is transferred to the AGC control line via $Q_8$, a field effect transistor which provides a high impedance at its input and a low impedance driving point to the AGC line. When $Q_7$ is turned off for the duration of the sync pulses, a discharge path for $C_8$ is provided via resistor $R_7$. The average voltage across $C_8$ is thus a measure of the ratio of the sync pulse width to blanking width. Since the tip of sync is clamped at a fixed level in the sync stripper, the establishment of a constant blanking level in the sync stripper via a feedback of the average voltage across $C_8$ constitutes a closed loop feedback AGC system. The AGC voltage is fed back to the AGC circuit causes the gain of the system to be changed in a manner to correct for any variations from the nominal blanking level in the sync stripper. Any variations in the blanking level changes the duty factor of the charging and discharging process of $C_8$ and thus its average voltage. The resultant AGC voltage is smoothed by the integrating effect of $C_8$.

When the signal levels into the sync stripper and summing circuits are maintained constant, the timing and level shifting operations of the encoder and decoder units will be maintained constant.

I claim:

1. A decoder for reconstructing a standard composite video signal with standard synchronizing pulses from a video signal V with only gray sync encoding $E_{GS}$, of a repetition rate $f_{GS}$, and comprising:

first generating means for generating a signal $E_{VCO}$ having a controllable frequency $f_{VCO}$ which, in the absence of frequency control, is slightly different from rate $f_{GS}$;

second generating means responsive to $E_{VCO}$ for generating a composite blanking signal $E_B$ having a repetition rate equal to $f_{VCO}$ so that $E_B$ will slew with respect to $E_{GS}$ until $E_B$ and $E_{GS}$ become synchronized;

summing means for summing $E_B$ and video signal V with gray sync encoding $E_{GS}$ to produce a reconstructed standard composite video signal when $E_B$ and $E_{GS}$ become synchronized; and phase lock means for phase locking $E_{VCO}$ with the standard synchronizing pulses of said reconstructed video signal to maintain $E_B$ and $E_{GS}$ in a synchronized relationship.

2. A television transmission system, comprising a transmitter for transmitting a video signal having gray sync encoding only, means at the receiver for translating the video signal having only gray sync to a standard video signal and comprising:

a summer having a first input terminal for receiving said video signal having gray sync only and having an output terminal for outputting said standard video signal;

a sync stripper and a composite blanking offset generator connected in a loop from said output terminal of said summer to a second input of said summer;

said blanking offset generator constructed to generate a composite blanking signal of controllable repetition rate in response to a control signal and having a repetition rate slightly different from that of said gray sync encoding in the absence of a control signal to enable said composite blanking signal to slew with respect to said gray sync encoding and ultimately become synchronized with said gray sync encoding;

said summer responsive to said synchronization of said gray sync encoding and said composite blanking signal to output to said sync stripper a composite video signal with standard sync signals; and means responsive to the output of said sync stripper when said synchronization occurs to phase lock the said composite blanking signal with said stripped sync signals and thereby to said gray sync encoding.

3. A decoder in a television transmission system for translating a received video signal V having gray sync encoding $E_{GS}$, with a repetition rate $R_{GS}$, to a standard video signal $V_S$ having standard synchronizing pulses $E_S$ including the serrated pulses occurring during the vertical synchronizing pulses, and comprising:

a summer having a first input terminal for receiving V and having an output terminal for outputting $V_S$;

a detector means for detecting the synchronizing signals $E_S$ in $V_S$ and a generator connected in a loop from said output terminal of said summer to a second input terminal of said summer;

said generator constructed to generate a composite blanking signal $E_B$ of controllable repetition rate which is slightly different from $R_{GS}$ in the absence of control means to enable $E_B$ to slew with respect to $E_{GS}$ and ultimately to become synchronized with $E_{GS}$;

said summer responsive to said synchronization of $E_B$ and $E_{GS}$ to output $V_S$ to said detector means; and said generator comprising control means responsive to $E_S$ in $V_S$ to phase lock $E_S$ with $E_B$ and therefore to phase lock $E_B$ with $E_{GS}$ when $E_B$ and $E_{GS}$ become synchronized.

4. A decoder according to claim 3 in which said control means comprises:

a phase lock loop including a voltage-controlled oscillator (VCO), and a phase detector receptive to the output $E_{VCO}$ of said VCO and to the output of said detector means to phase lock $E_{VCO}$ with $E_S$;

in which said composite blanking offset generator further comprises;

a first pulse generator operative to translate $E_{VCO}$ to standard horizontal blanking pulses;

a divide-by-N counter receptive to $E_{VCO}$, where N depends on the number of horizontal lines per frame of $V_S$;

means responsive to the serrated pulses occurring during the vertical synchronizing pulse in $E_S$ to reset said counter;

a second pulse generator operative to translate the output of said counter to a standard vertical blanking pulse; and means to combine said horizontal and vertical blanking pulses to form an output composite blanking pulse and apply it to the second input of said summer.

5. A composite blanking generator according to claim 4, and further comprising gate means connected to prevent the coupling of an input pulse to the phase detector if the pulse occurs less than about ¾ H following a preceding input pulse, where H is equal to the period of one horizontal line scan.

6. A composite blanking generator according to claim 4 wherein said phase detector includes an output for a phase lock-indicating signal, and means responsive thereto and to an output of the VCO to make said gate means provide a noise-rejecting narrow window for pulses having a 1/H repetition rate.

7. In a television transmission system having an encoder at a transmitter for producing a video signal having gray sync encoded signals and means for transmitting said video signal having gray sync encoding only to a receiver, a decoder at a receiver for reconstructing a standard composite video signal from said received video signal having gray sync encoding only and comprising:

a summer having a first input terminal for the received video signal and having an output terminal for outputting a standard video signal;

a sync stripper receptive to said standard video signal from said summer;

a composite blanking offset signal generator having an input terminal coupled to the output terminal of said sync stripper, and having an output terminal coupled to a second input terminal of said summer;

said generator constructed to generate a composite blanking signal of controllable repetition rate which is slightly different from that of the gray sync encoding in the absence of phase lock therebetween to enable said composite blanking signal to slew with respect to said gray sync encoding and ultimately to become synchronized with said gray sync encoding;

said summer responsive to said synchronization of said composite blanking signal and said gray sync encoding to supply a standard composite video signal to the input terminal of said sync stripper; and a phase lock loop responsive to the stripped sync pulses outputted from said sync stripper to phase lock said composite blanking signal with the gray sync encoding of the received video signal.

8. A decoder at a television receiver for translating a video signal having gray sync encoding only to a standard video signal and comprising:

a summer having a first input terminal for receiving said video signal having gray sync encoding only and having an output terminal for outputting said standard video signal;

logic means including a composite blanking offset generator connected in a loop from said output terminal of said summer to a second input of said summer;

said blanking offset generator constructed to generate a composite blanking signal of controllable repetition rate in response to a control signal and having a repetition rate slightly different from that of said gray sync encoding in the absence of a control signal to enable said composite blanking signal to slew with respect to said gray sync encoding and ultimately become synchronized with said gray sync encoding;

said summer responsive to said synchronization of said gray sync encoding and said composite blanking signal to output to said logic means a composite video signal with standard reconstructed sync signals; and said logic means responsive to the output of said summer when said synchronization occurs to phase lock the said composite blanking signal with said standard reconstructed sync signals and thereby to said gray sync encoding.

9. A method of reconstructing a standard composite video signal with standard synchronizing pulses from a video signal V with only gray sync encoding $E_{GS}$, of a repetition rate $f_{GS}$, and comprising the steps of:

generating a signal $E_{VCO}$ having a controllable frequency $f_{VCO}$ which, in the absence of frequency control, is slightly different from $f_{GS}$;

generating from $E_{VCO}$ a composite blanking signal $E_B$ having a repetition rate equal to $f_{VCO}$ so that $E_B$ will slew with respect to $E_{GS}$ until $E_B$ and $E_{GS}$ become synchronized;

summing $E_B$ and V to produce a reconstructed standard composite video signal when $E_B$ and $E_{GS}$ become synchronized; and phase locking $E_{VCO}$ with the standard synchronizing pulses of said reconstructed video signal to maintain $E_B$ and $E_{GS}$ in a synchronized relationship.

10. In a television transmission system comprising a transmitter for transmitting a video signal $V_S$ with gray sync encoding $E_{GS}$ having a repetition rate $f_{GS}$, a method for reconstructing a standard composite video signal V at a receiver employing only the said gray sync encoding $E_{GS}$ and comprising the steps of:

generating a signal $E_{VCO}$ having a controllable frequency $f_{VCO}$ which, in the absence of supplied frequency control signals, is slightly different from $f_{GS}$ to enable $E_{VCO}$ to slew with respect to $E_{GS}$;

generating from $E_{VCO}$ a composite blanking signal $E_B$ having the same frequency as $f_{VCO}$ and having a phase difference $\Delta\phi$ reflecting the phase difference between the beginning of a blanking pulse and a reconstructed synchronizing pulse, so that $E_B$ will slew with respect to $E_{GS}$ until $E_B$ and $E_{GS}$ become synchronized;

summing $E_B$ and $V_S$ to produce a reconstructed standard composite video signal V when $E_B$ and $E_{GS}$ become synchronized;

clipping the reconstructed synchronizing pulses from said reconstructed video signal; and phase locking $E_{VCO}$ with the clipped reconstructed synchronizing pulses to maintain $E_B$ and $E_{GS}$ in a synchronized relationship.

* * * * *